US010929525B2

(12) United States Patent
Ganchev et al.

(10) Patent No.: US 10,929,525 B2
(45) Date of Patent: Feb. 23, 2021

(54) SANDBOXING OF SOFTWARE PLUG-INS

(71) Applicant: VMware, Inc., Palo Alto, CA (US)

(72) Inventors: Tony Ganchev, Sofia (BG); Plamen Dimitrov, Sofia (BG); Vladimir Velikov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 263 days.

(21) Appl. No.: 16/017,959

(22) Filed: Jun. 25, 2018

(65) Prior Publication Data
US 2019/0392136 A1 Dec. 26, 2019

(51) Int. Cl.
G06F 21/53 (2013.01)
G06F 9/445 (2018.01)
G06F 8/61 (2018.01)

(52) U.S. Cl.
CPC ............. *G06F 21/53* (2013.01); *G06F 8/61* (2013.01); *G06F 9/44526* (2013.01); *G06F 2221/033* (2013.01)

(58) Field of Classification Search
CPC ........ G06F 21/53; G06F 9/44526; G06F 8/61; G06F 2221/033
USPC .......................................................... 726/22
See application file for complete search history.

(56) References Cited

U.S. PATENT DOCUMENTS

| 9,652,214 B1* | 5/2017 | Eberlein | G06F 9/44526 |
| 2007/0156913 A1* | 7/2007 | Miyamoto | G06F 9/44526 |
| | | | 709/230 |
| 2010/0107097 A1* | 4/2010 | Ferlitsch | G06F 9/4411 |
| | | | 715/764 |

OTHER PUBLICATIONS

OSGi Version 6 Enterprise Specification https://osgi.org/download/r6/osgi.enterprise-6.0.0.pdf.
Apache Aries Subsystem Implementation http://aries.apache.org/modules/subsystems.html.
U.S. Appl. No. 15/799,423, filed Oct. 31, 2017.

* cited by examiner

Primary Examiner — Mohammad W Reza
(74) Attorney, Agent, or Firm — Patterson + Sheridan, LLP

(57) ABSTRACT

The disclosure provides an approach for installing and deploying a plug-in on a computer system so as to extend an extensible software. The plug-in is encapsulated in an installation file recognizable by the extensible software as indicating that the software modules within the installation file should be installed within their own local scope on the extensible software. The approach further provides a method for handling a request for an application programming interface by a service module of an installed plug-in. The method of handling the request includes determining whether the requested API is within a local scope of the service module, and if so, providing the API from the local scope, or otherwise, providing the API from the global scope of the extensible software.

11 Claims, 4 Drawing Sheets

SANDBOXING OF SOFTWARE PLUG-INS

BACKGROUND

Extensible software is software comprising core code that can be extended by add-on code (e.g., a software package). The add-on code may comprise additional code beyond the core code, resulting in "extensible" software. The additional code can be added to the extensible software to work with the core code, and can be subsequently removed from the core code without affecting the functionality of the core code. The additional code can sometimes be added to the core code during execution of the core code, without needing to stop execution of the core code. The additional code or add-on code is often referred to as a "plug-in."

Plug-ins are composed of software modules. In some cases, the software modules may be of two types: (a) service modules and (b) library modules. Service modules perform a service, and library modules comprise application programming interfaces (APIs). The service modules ("services") contain the logic specific to the plug-in. While executing the logic of the plug-in, the services access APIs within library modules ("libraries") to perform the logic of the plug-in. Software "modules" are sometimes referred to as "bundles."

Service modules are usually created by the vendor of the plug-in, while libraries are often obtained by the vendor from third parties. Third-party libraries are often "off-the-shelf," open-source libraries that can be used by various plug-in vendors. Off-the-shelf library modules provide generic functionality that plug-ins can reuse without having to re-implement the functionality. Libraries are broken up into namespaces, which are groups of APIs. During plug-in installation, libraries may export various namespaces for use by the extensible software during execution of the extensible software. Namespaces are sometimes referred to as "packages.".

During plug-in installation, a library exports namespaces for use by the extensible software. A user might install a first plug-in, which exports a first namespace. Then, the user might install a second plug-in that exports a second namespace with the same identifier as the first namespace. A namespace identifier can be, for example, the filename of the namespace or a combination of the namespace filename and the namespace version. If a namespace with the same identifier has already been installed within the extensible software, then a namespace with that same identifier will not be installed a second time. Instead, the extensible software will make available the previously installed namespace for the second plug-in.

However, vendors sometimes modify third-party libraries and namespaces without changing the namespace identifiers. A previously installed namespace of the first plug-in might be different from the namespace of the second plug-in, despite having the same identifier. This can cause an error when the second plug-in is deployed or when the second plug-in is running, because the second plug-in might not be able to access APIs that it needs for proper functioning. The error would result in failure of the second-plugin and/or the extensible software.

SUMMARY

A method described herein provides installing and deploying a plug-in on a computer system, the computer system comprising a storage system, wherein the installing extends an extensible software installed on the computer system, the method comprising checking that the plug-in is encapsulated in an installation file comprising scoping code, and determining that the scoping code indicates that one or more files of the plug-in should be exported into a local scope. The method further provides, responsive to the determining, implementing the local scope within the extensible software, exporting the one or more files of the plug-in into the local scope of the storage system, and executing at least one of the one or more files of the plug-in.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for implementing local scope within extensible software for installation and deployment of plug-ins. Local scope for each plug-in prevents collisions between namespaces that have the same identifier. A namespace "identifier" may be, for example, the filename of the namespace or a combination of the namespace filename and the namespace version. A plug-in that is to be installed is encapsulated in an installation file recognizable by the extensible software. Code in the installation file indicates to extensible software that the encapsulated plug-in should be installed within its own local scope within the extensible software. The approach is advantageous because it removes the necessity to research what libraries or namespaces are used by plug-ins of an extensible software in order to prevent collisions. Researching libraries or namespaces used by a plug-in is difficult if not impossible, because the code of a plug-in is usually proprietary. The approach is advantageous because it prevents collisions between plug-ins, removing the necessity to plan for or resolve collisions. The approach is advantageous because for some extensible software, the vendors of plug-ins are unknown, so researching libraries and namespaces is difficult. Further, the approach improves the functioning of the computing device running the extensible software because the approach prevents collisions that may crash the computing device or may cause errant operations of the computing device. The techniques herein can be deployed without connection to a remote database of a plug-in vendor, such as through the Internet, to obtain plug-in file and identifier information.

Figure 1:
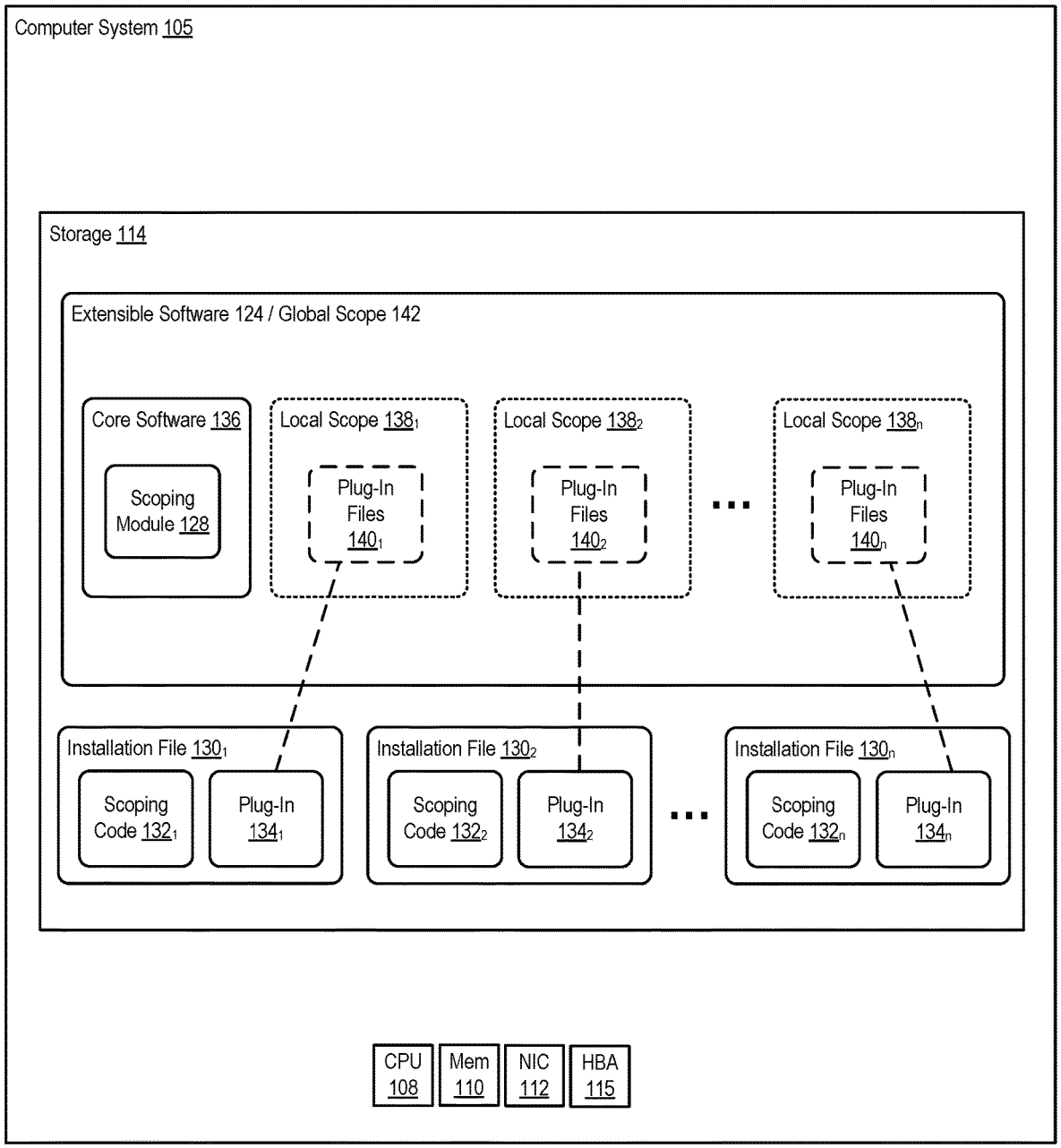
FIG. 1 depicts a block diagram of a computer system in which one or more embodiments of the present disclosure may be utilized.

FIG. 1 depicts a block diagram of a computer system 105 in which one or more embodiments of the present disclosure may be utilized. Computer system 105 may be constructed on a server grade hardware platform, such as an x86 architecture platform. Computer system 105 may be a single computing device. Or, computing system 105 may be composed of several computing devices that share resources in a distributed manner, such as geographically co-located servers on the same rack or on different racks in a datacenter (not shown). Computer system 105 may also be a virtual computing instance (VCI) running on top of a hypervisor within a physical computing device (not shown). The VCI may be a virtual machine (VM), container, Docker container (see, e.g., www.docker.com), data compute node, isolated user space instance, namespace container, and the like. For an example of a host machine configuration supporting VCIs, see FIG. 1B and the accompanying description within application Ser. No. 15/799,423, filed Oct. 31, 2017, the entire contents of which are incorporated by reference herein.

Computer system 105 may include hardware components such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and/or in storage 114. Network interface 112 enables computer system 105 to communicate with other devices via a communication medium, such as data network 122 and/or management network 126. Network interface 112 may include one or more network adapters or ports, also referred to as Network Interface Cards (NICs), for connecting to one or more physical networks.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples computer system 105 to one or more external storages (not shown), such as a storage area network (SAN) or distributed virtual SAN. Other external storages that may be used include network-attached storage (NAS) and other network data storage systems, which may be accessible via NIC 112.

Storage system 114 represents persistent storage device (s). Although storage 114 is shown as being local to computer system 105, storage 114 may be external to computer system 105, such as by connection via HBA 115. Storage 114 stores software files, such as extensible software 124 and one or more installation files $130_1$ to $130_n$ (collectively referred to as installation files 130 and individually referred to as installation file 130).

Extensible software 124 comprises core software 136 and optionally plug-in files 140. Plug-in files 140 are files that are added to extensible software 124 when plug-in 134 is installed on computer system 105. Core software 136 of extensible software 124 can be extended by plug-in files 140 so as to work as one software. Core software 136 is the original software of extensible software 124 that remains the same as extensible software 124 is extended by plug-in files 140. Core software 136 may be updated through an update process (not shown) that is separate from extending extensible software 124 through the installation of plug-in 134. Plug-in files 140 can be installed or uninstalled on computer system 105 without modifying the code of core software 136. This is different from an update to extensible software 124 in that an update modifies core software 136 and requires downtime of core software 136, while plug-in files 140 work alongside core software 136 and installation of plug-in files 140 may occur while core software 136 is running. Core software 136 comprises scoping module 128. Optionally, core software 136 does not comprise scoping module 128, and scoping module 128 comprises files added to extensible software 124 from plug-in 134.

It should be noted that although extensible software 124 is depicted within storage 114 in FIG. 1, during execution of extensible software 124, components 124, 128, 136, 138, 140, and 142 may be running within memory 110 rather than in storage 114, substantially as shown in FIG. 1.

Figure 2:
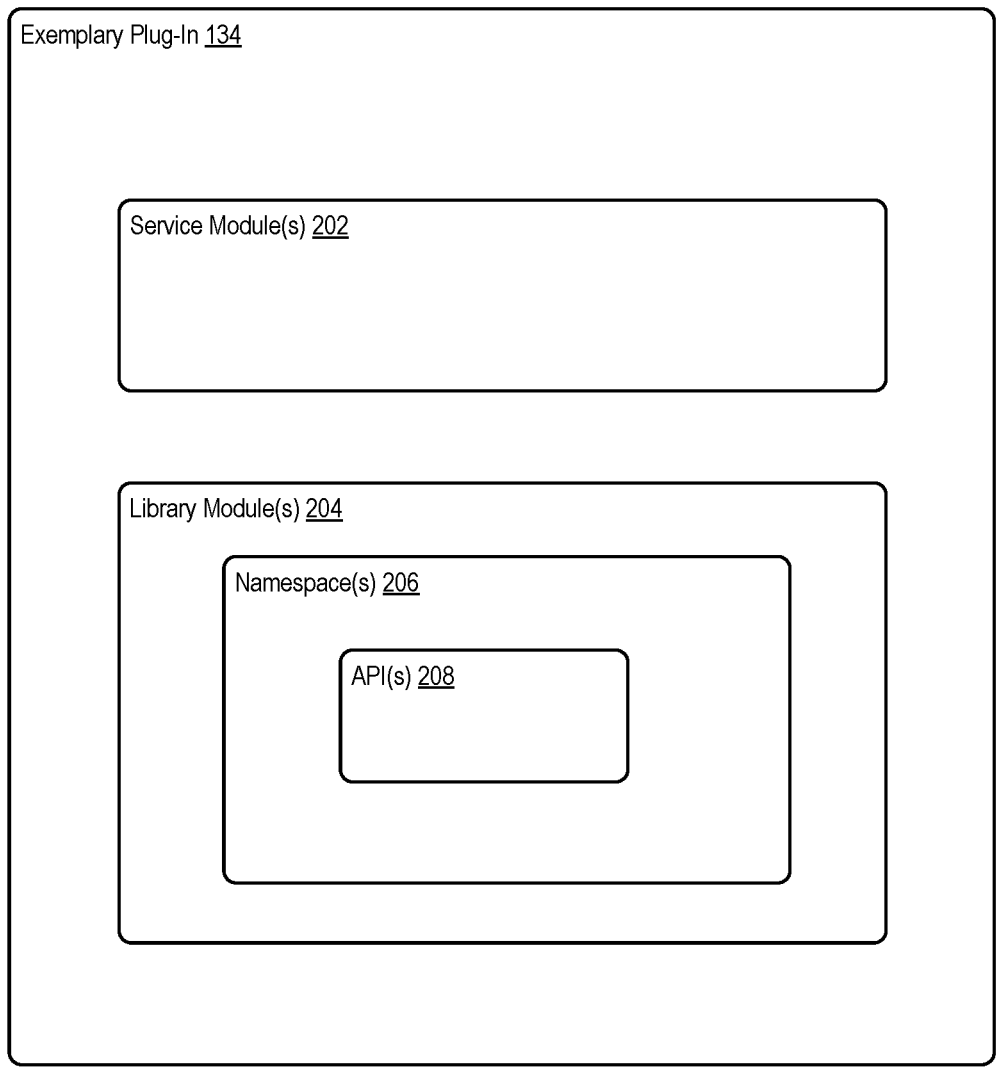
FIG. 2 depicts a block diagram of an exemplary plug-in, according to an embodiment.

FIG. 2 depicts a block diagram of an exemplary plug-in 134, according to an embodiment. In an embodiment, the structure of exemplary plug-in 134 of FIG. 2 is also the structure of plug-in files 140 installed within extensible software 124. In a second embodiment, the structure of exemplary plug-in 134 of FIG. 2 is also the structure of plug-in files 140, except that library module 204 is not present, although namespace(s) 206 and API(s) 208 are present. That is, in the second embodiment, library module 204 exports namespaces 206 (along with APIs 208) onto storage 114, creating new copies of namespaces 206 without retaining organization of namespaces 206 within library modules 204.

As described above, service modules 202 perform the logic of plug-in 134, while APIs 208 contains classes, functions, procedures, etc. that are accessed by service modules 202 while performing the logic of plug-in 134. API 208 may be a file with a ".class" file extension. One or more APIs 208 may be organized into a group called a namespace 206. Namespace 206 may be, for example, a folder containing APIs 208, or a file with a ".package" file extension containing APIs 208. Namespace 206 may be a label (e.g., metadata) added to each API 208, such that all APIs 208 with the same label are part of the same namespace 206. One or more namespaces 205 may be organized into a group called a library (i.e., library module 204). Library module 204 may be a file with a ".jar" file extension, but the file extension may vary depending on operating system on which the library module 204 is running or on the programming language in which library module 204 is written. In an embodiment, during installation of plug-in 134 to extend extensible software 124, library module 204 exports namespaces 206, along with APIs 208 of namespaces 206, into local scope 138 of extensible software 124 or into global scope 142 of extensible software 124. Installing and deploying plug-in files 140 within local scope 138 may be referred to as "isolating" or "sandboxing" of plug-in 134 or of plug-in files 140.

Returning to FIG. 1, scoping module 128 is a software service within extensible software 124 that creates and manages local scopes 138 and global scope 142 of files on storage 114 and memory 110. When plug-in 134 is installed, scoping module 128 checks whether plug-in 134 is encapsulated by installation file 130 that includes scoping code 132. Scoping code 132 is code that indicates to scoping module 128 that the plug-in 134 that is being installed should be installed within its own local scope 138, separate from scopes of already-installed plug-in files 140. When extensible software 124 is running within memory 110, scoping module 128 manages local scopes 138 and global scope 142 so that service module 202 accesses the correct APIs 208, as per scope 138/142 of service module 202. In an embodiment, local scope 138 contains plug-in files 140 of no more than one plug-in 134. In an embodiment, scoping code 132 is not executable code that itself implements local scope 138. Scoping code 132 is metadata that is read or scanned by scoping module 128, and scoping code 132 signals to scoping module 128 that scoping module 128 is to implement local scope 138 for plug-in 134 whose modules have been repackaged into installation file 130.

The term "collision" as used herein refers to a situation in which two separate plug-ins 134 each contain namespace 206 having the same namespace identifier, and both namespaces 206 are being installed within the same scope of extensible software 124. Each namespace identifier must be unique within a given scope, or else a collision occurs when a second namespace 206 with a same identifier is being installed within the same scope.

Installation file 130 and scoping code 132 may comply with the open software gateway initiative (OSGi) standard, as described in OSGi Enterprise, Release 6, July 2015, published by The OSGi Alliance. Installation file 130 and scoping code 132 may comply with the standards of a "subsystem," as described in the OSGi Core document, and may have a ".eas" file extension. Extensible software 124 and/or scoping module may also comply with the OSGi standard. Installation file 130 may be a Plan Archive (PAR) file, such as a Virgo™ from EclipseRT™ type PAR file with a ".par" file extension.

Global scope 142 is scope that is synonymous with scope of extensible software 124 on storage 114 or when extensible software 124 is executing on memory 110. Global scope 142 may be represented by the same box on FIG. 1 as extensible software 124. That is, files that are within global scope 142, and not within one of local scopes 138, are visible to other files of extensible software 124, whether the other files are within global scope 142 or local scope 138.

In the prior art, all plug-in files 140 were installed within global scope 142. If all plug-in files 140 are installed within global scope 142, then when two namespaces 206 have the same identifier, a collision between the two namespaces would occur, and only one of the namespaces 206 would be installed. Scoping module 128 creates local scope 138 for files of plug-in 134 (i.e., for plug-in files 140) being installed, so that two namespaces 206 with the same identifier can both be added to extensible software 124.

Scoping module 128 may implement local scope 138 on storage 114 during installation of plug-in 134 in various ways. For example, when exporting namespaces 206 onto storage 114, scoping module 128 may create separate folders for each plug-in 134. During installation, scoping module 128 may create a data structure, such as a table, that associates service modules 202, namespaces 206, and APIs 208 with scopes 138/142.

Scoping module 128 may implement and manage local scope 138 on memory 110 during execution of extensible software 124 in various ways. For example, scoping module 128 may maintain a list of service modules 202, with each service module 202 associated with namespace(s) 206 and/or API(s) 208 that are within the same scope 138/142 as the service module 202. All requests by service module 202 for API 208 may be filtered through scoping module 128. If service module $202_1$ requests API $208_1$, scoping module 128 would first check for the presence of the requested API $208_1$ within local scope $138_1$, and if not available, then would check global scope 142. If service module $202_1$ requests API $208_2$, which is not present within local scope $138_1$, not present within global scope 142, but present within another local scope 138, then scoping module 138 returns an error to the requesting service module $202_1$. In other words, if two plug-ins 134 export namespace 202 having a same identifier onto storage 114, then scoping module 128 may interpret a request by service module 202 of the first plug-in 134 as directed to namespace 202 of the first plug-in and not to namespace 202 of the second plug-in 134, and this may be done by referencing a data structure, such as a table or list, that associates service modules 202, namespaces 206, and APIs 208 with scopes 138/142.

Figure 3:
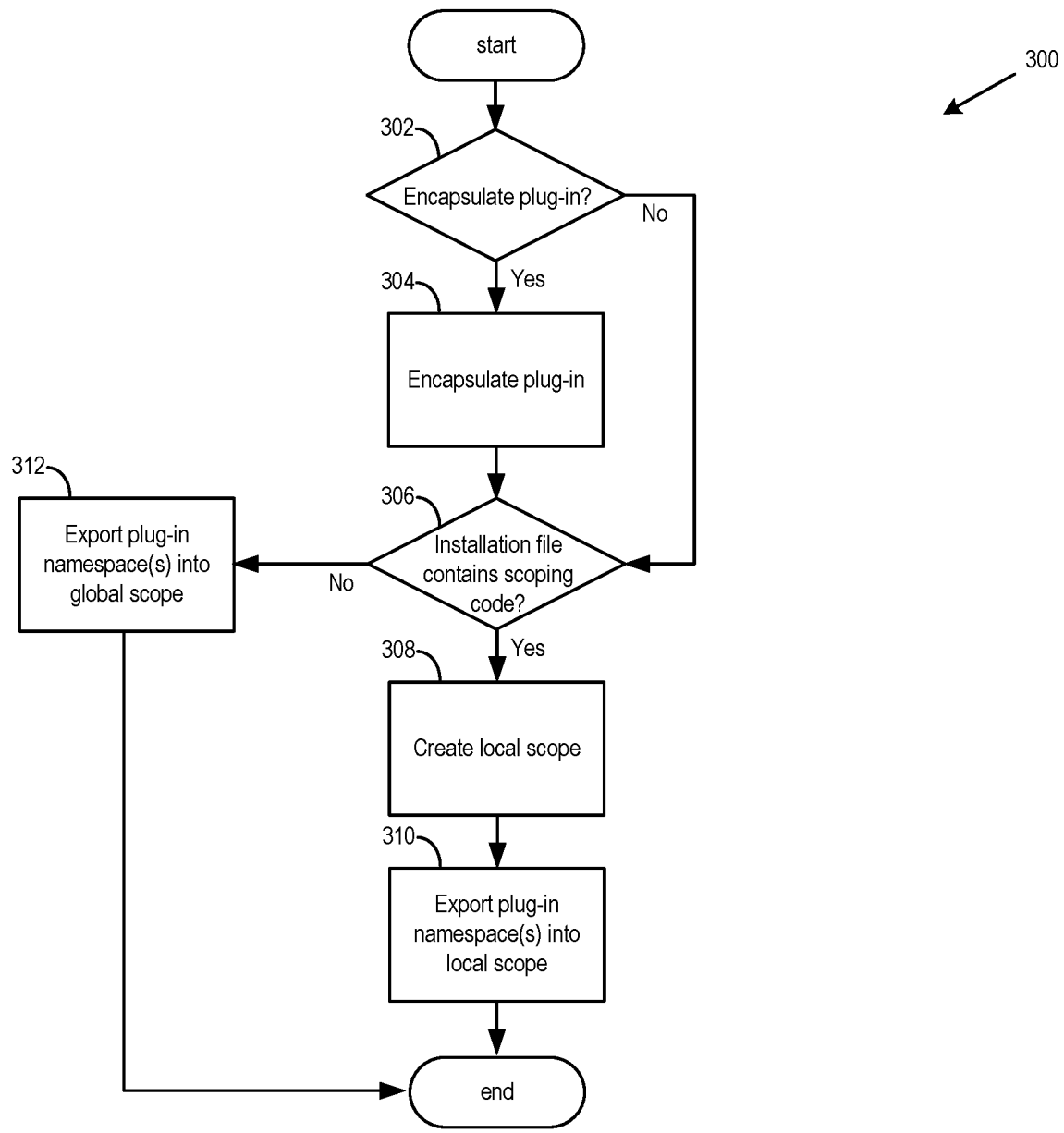
FIG. 3 depicts a flow diagram of a method of installing a plug-in, according to an embodiment.

FIG. 3 depicts a flow diagram of a method 300 of installing plug-in 134, according to an embodiment. Method 300 may be triggered manually by an administrator, or may be triggered automatically, such by extensible software 124 upon detection of plug-in 134.

At block 302, an administrator, scoping module 128, or another module determines whether to encapsulate plug-in 134 into installation file 130. Plug-in 134 may not need to be encapsulated if, for example, it had already encapsulated in an installation file 130 by a vendor or if plug-in 134 does not need to be installed into its own local scope 138.

If plug-in 134 is not pre-encapsulated in installation file 130, administrator, scoping module 128, or another module determines whether plug-in 134 needs to be installed into local scope 138 or into global scope 142. In an embodiment, all plug-ins 134 are installed into their own local scope 138. In a second embodiment, plug-ins 134 are installed into local scope 138 only if at least one of namespaces 206 of plug-in 134 is determined to have the same identifier as a namespace 206 already present in global scope 142. In the second embodiment, plug-in 134 is installed into its own local scope 138 only if a collision between namespace identifiers occurs. If it is determined that plug-in 134 being installed is to be encapsulated in installation file 130, method 300 proceeds to block 304. If plug-in 134 does not need to be encapsulated in installation file 130, then method 300 proceeds to block 306.

At block 304, administrator, scoping module 128, or another module encapsulates plug-in 134 in installation file 130, making sure that installation file 130 includes scoping code 132 recognizable by scoping module 128. Encapsulation of plug-in 134 may be performed by scoping module 128 by scanning or reading through metadata of plug-in 134, determining what software modules 202/204 are present within plug-in 134, repackaging the modules into a new file, such as installation file 130, and providing installation file 130 containing repackaged modules 202/204 to an operating system of computer system 105 for deployment.

At block 306, scoping module 128 determines whether plug-in 134 is encapsulated in installation file 130, and whether installation file 130 includes scoping code 132. If scoping module 128 locates scoping code 132, and scoping code 132 indicates that plug-in 134 should be installed into local scope 138 of extensible software 124, method 300 proceeds to block 308. If scoping module 128 does not locate scoping code 132, or scoping code 132 does not indicate that plug-in 134 should be installed into local scope 138, then method 300 proceeds to block 312, at which plug-in 134 is installed into global scope 142 and method 300 ends.

At block 308, scoping module 128 implements local scope 138 for plug-in files 140 to be exported onto storage 114 within extensible software 124. Scoping module 128 may create local scope 138 by creating a separate folder each plug-in 134, and by creating a data structure, such as a table, that associates exported service modules 202, namespaces 206, and APIs 208 with newly created local scope 138.

At block 310, plug-in 134 exports plug-in files 140 onto storage 114, within local scope 138 created at block 308. After block 310, method 300 ends.

Figure 4:
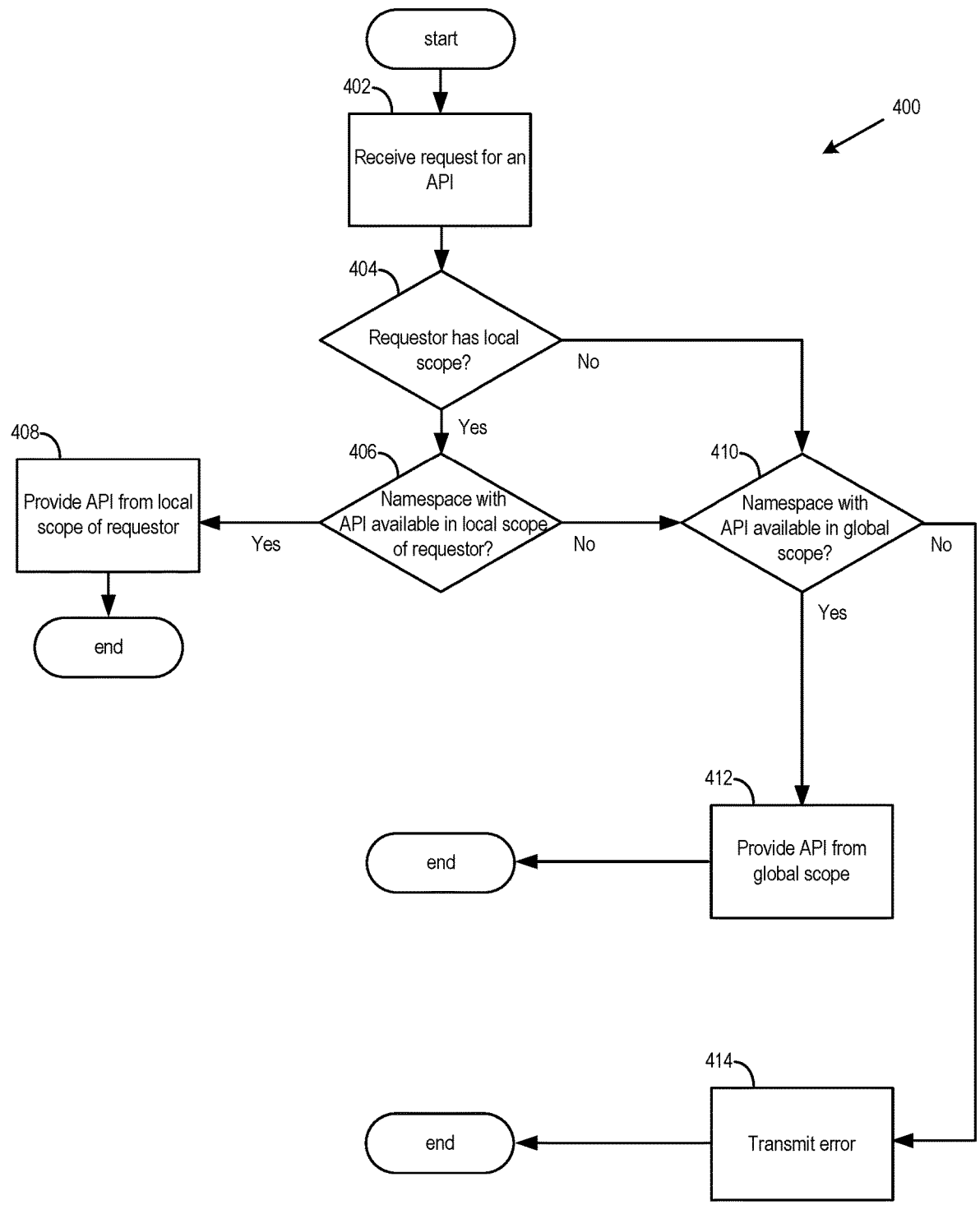
FIG. 4 depicts a flow diagram of a method of handling a request for an application programming interface, according to an embodiment.

FIG. 4 depicts a flow diagram of a method 400 of handling a request for an API 208 by extensible software 124 after an installed plug-in 134 has been deployed, according to an embodiment. Method 400 is performed by extensible software 124, in conjunction with scoping module 128 of extensible software 124.

At block 402, service module 202 sends a request to extensible software 124, requesting access to API 208, and extensible software 124 receives the request. The request might be sent, for example, because service module 202 needs to access a function that is implemented within API 208.

At block 404, extensible software 124 passes the request to scoping module 128, which determines whether service module 202 that sent the request is within local scope 138. If service module 202 is within local scope 138, then method 400 proceeds to block 406. If service module 202 is not within local scope 138, then method 400 proceeds to block 410.

At block 406, scoping module 128 determines whether namespace 206 containing requested API 208 is available within local scope 138 of service module 202 that sent the request at block 402. Scoping module 128 may determine this, for example, by accessing a table that associates components shown in FIG. 2 with their particular scopes 138/142. If namespace 206 with requested API 208 is available in local scope 138 of service module 202, then method 400 proceeds to block 408. Otherwise, method 400 proceeds to block 410.

At block 408, scoping module 128 provides access to requested API 208, from local scope 138, to service module 202 that requested API 208. After block 408, method 400 ends.

At block 410, scoping module 128 determines whether namespace 206 containing requested API 208 is available within global scope 142. If so, then at block 412, scoping module 128 provides access to requested API 208, from global scope 142, to service module 202 that requested API 208, and method 400 ends. If scoping module 128 determines that namespace 206 containing requested API 208 is not available within global scope 142, then at block 414, scoping module 128 transmits an error to service module 128, and method 400 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of installing and deploying a plug-in on a computer system, the computer system comprising a storage system, wherein the installing extends an extensible software installed on the computer system, the method comprising:
    checking that the plug-in is encapsulated in an installation file comprising scoping code;
    determining that the scoping code indicates that one or more files of the plug-in should be installed into a local scope isolated from another local scope of another plug-in of the extensible software;
    responsive to the determining, isolating the local scope from the other local scope within the extensible software;
    installing the one or more files of the plug-in into the local scope of the storage system;
    determining that a first namespace has a same identifier as a second namespace of the one or more files of the plug-in, wherein the isolating the local scope and the installing the one or more files of the plug-in into the local scope are performed if the first namespace has the same identifier as the second namespace; and
    executing at least one of the one or more files of the plug-in.

2. The method of claim 1, wherein the installation file is a plan archive (PAR) file.

3. The method of claim 1, further comprising, prior to the checking, encapsulating the plug-in within the installation file that comprises scoping code.

4. The method of claim 1, further comprising:
    receiving a request, by the extensible software from a service module of the extensible software, to access an application programming interface (API), wherein the API is contained within a first namespace, and the first namespace has a same identifier as a second namespace of the extensible software;
    determining that the service module is contained within the local scope;
    determining that the first namespace is contained within the local scope; and
    providing access to the API to the service module.

5. A non-transitory computer readable medium comprising instructions to be executed in a processor of a computer system, the instructions when executed in the processor cause the computer system to carry out a method of installing and deploying a plug-in on a computer system, the computer system comprising a storage system, wherein the installing extends an extensible software installed on the computer system, the method comprising:
    checking that the plug-in is encapsulated in an installation file comprising scoping code;
    determining that the scoping code indicates that one or more files of the plug-in should be installed into a local scope isolated from another local scope of another plug-in of the extensible software;
    responsive to the determining, isolating the local scope from the other local scope within the extensible software;
    installing the one or more files of the plug-in into the local scope of the storage system;
    determining that a first namespace has a same identifier as a second namespace of the one or more files of the plug-in, wherein the isolating the local scope and the installing the one or more files of the plug-in into the local scope are performed if the first namespace has the same identifier as the second namespace; and
    executing at least one of the one or more files of the plug-in.

6. The non-transitory computer readable medium of claim 5, wherein the installation file is a plan archive (PAR) file.

7. The non-transitory computer readable medium of claim 5, the method further comprising, prior to the checking, encapsulating the plug-in within the installation file that comprises scoping code.

8. The non-transitory computer readable medium of claim 5, the method further comprising:
    receiving a request, by the extensible software from a service module of the extensible software, to access an application programming interface (API), wherein the API is contained within a first namespace, and the first namespace has a same identifier as a second namespace of the extensible software;
    determining that the service module is contained within the local scope;
    determining that the first namespace is contained within the local scope; and
    providing access to the API to the service module.

9. A computer system comprising:
    a storage system;
    an extensible software installed on the computer system; and
    a processor, wherein the processor is programmed to carry out a method of installing and deploying a plug-in on the computer system, wherein the installing extends the extensible software, the method comprising:

checking that the plug-in is encapsulated in an installation file comprising scoping code;

determining that the scoping code indicates that one or more files of the plug-in should be installed into a local scope isolated from another local scope of another plug-in of the extensible software;

responsive to the determining, isolating the local scope from the other local scope within the extensible software;

installing the one or more files of the plug-in into the local scope of the storage system;

determining that a first namespace has a same identifier as a second namespace of the one or more files of the plug-in, wherein the isolating the local scope and the installing the one or more files of the plug-in into the local scope are performed if the first namespace has the same identifier as the second namespace; and executing at least one of the one or more files of the plug-in.

10. The computer system of claim 9, wherein the installation file is a plan archive (PAR) file.

11. The computer system of claim 9, the method further comprising, prior to the checking, encapsulating the plug-in within the installation file that comprises scoping code.

* * * * *